W. THOMSON.

BANK ACCOUNT BOOK.

No. 10,977. Reissued Dec. 25, 1888.

Witnesses

H. Everance

R. W. Deane

Inventor

Walter Thomson

L. Deane, his Attorney

UNITED STATES PATENT OFFICE.

WALTER THOMSON, OF FARGO, DAKOTA TERRITORY.

BANK ACCOUNT-BOOK.

SPECIFICATION forming part of Reissued Letters Patent No. 10,977, dated December 25, 1888.

Original No. 385,648, dated July 3, 1888. Application for reissue filed November 23, 1888. Serial No. 291,706.

*To all whom it may concern:*

Be it known that I, WALTER THOMSON, a citizen of the United States, residing at Fargo, in the county of Cass and Territory of Dakota, have invented certain new and useful Improvements in Bank Account-Books; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
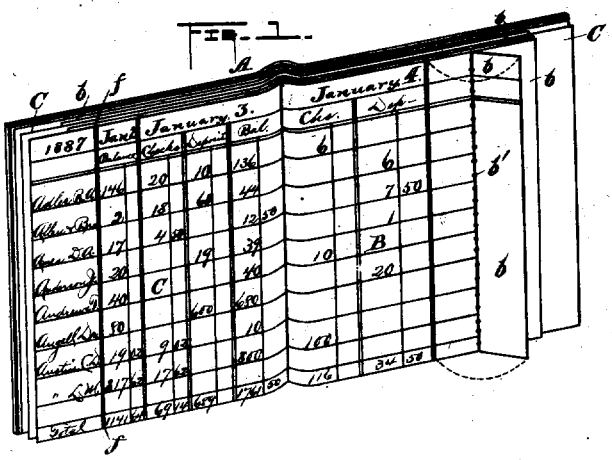
Figure 2:
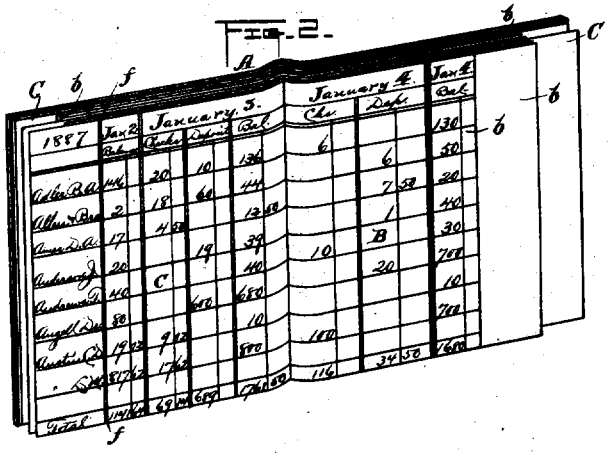
Figure 4:
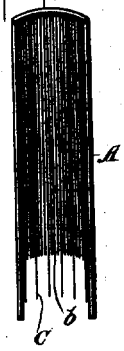
Figure 3:
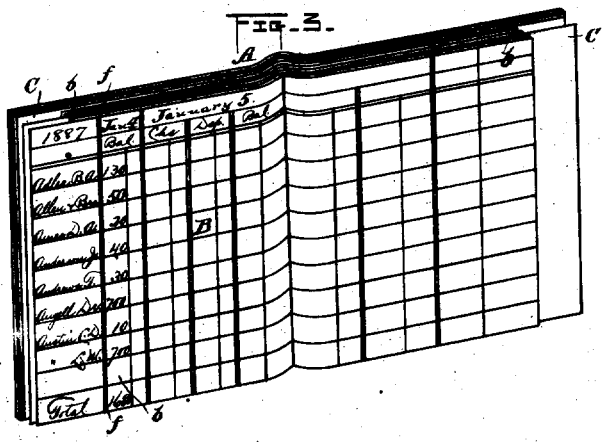

Figure 1 is a perspective view of an account-book opened, showing the present invention. Fig. 2 is a like view, the outer edge of the first short leaf folded over to allow the account to continue uninterruptedly. Fig. 3 is a like view as Figs. 1 and 2, the first short leaf turned back upon the wide primary leaf preceding it, the folded portion straightened, so that the short leaf is opened out flat upon the primary leaf. Fig. 4 is a plan view of the top edge of the book when closed.

This invention relates chiefly to account-books used in banks to show in a convenient form the state of each depositor's account.

In the accompanying drawings, A denotes an account-book prepared in any usual manner to keep the accounts of bank depositors, except in the particular forms of construction, which will be hereinafter more fully described and explained. The leaves of this book are made up of a series of short ones, B, interspersed with a long leaf, C. By the terms "short" and "long," applied to the leaves, is meant, first, a leaf which does not extend fully to the edge of the book; and, secondly, the leaf is one of the ordinary size relative to the covers of the book. Each of the leaves B is creased or perforated at $b'$ not far from its right-hand edge and parallel thereto, so that the margin or portion $b$ beyond the line may, when desired, be easily turned back upon the body of the leaf.

The several pages of the book are ruled and otherwise, except as is peculiar to my invention, prepared as usual for keeping the depositor's accounts. In using the book, in the first instance there is written on the long leaf, down the left-hand margin, in the usual manner, the depositors' names. When in the course of business these accounts have nearly reached to the line $b'$, the part $b$ can be folded over to the left—that is, toward the approaching accounts—and the balances are thereon duly entered. Thus when the leaf B is turned over upon the said leaf C, and the folded part of said leaf B is straightened out or flattened, the balances thereon entered, as above, will now be in proper relation to the names of the depositors entered, as has been stated above, on the left-hand edge of leaf C. Then the book-keeper can go on with his entries till he has nearly reached the line of crease or perforation $b'$ on the next leaf B, when the above operation will be gone through again, and so he will continue with his entries till he comes to the next leaf C, when it will be necessary to enter again the depositors' names and go on in connection with the next series of short leaves as he has done in the first instance.

In Fig. 1 the short leaf B is flat with the leaf C, and the edge or margin $b$ of the first short leaf slightly turned. In Fig. 3 the first short leaf has been turned over and the strip $b$ flattened and straighted out, so that its edge comes just against the vertical line $f$, where the depositors' names end. The figures on the part $b$ show the balance of each depositor directly opposite his name. These deposit account-books may be of any desired size or shape, and with each full leaf there may be as many intermediate short leaves as may be desired.

I do not wish to limit this invention to bank-depositors' books only, for the principle may be applied to books for many other purposes wherever successive entries are to be made following a set of names or other general matters to which the entries have a common relation.

Having now described my invention, what I claim is—

1. The bank account-book A, having a suitable number of full leaves, C, and alternate series of short leaves, B, each of said short leaves having margin $b$, creased or perforated at $b'$, substantially as and for the purposes set forth.

2. The bank account-book herein described, composed of alternate long and series of short leaves, the several long leaves prepared to receive the depositors' names on the left-hand side, and both also prepared to receive the accounts for several successive days, the right-hand end of each of said short leaves having a margin adapted by folding to receive the last day's balance, so that when the leaf is turned and said margin straightened out said balance forms the beginning of the next day's account on the next page.

In testimony whereof I affix my signature in presence of two witnesses.

WALTER THOMSON.

Witnesses:
R. S. LEWIS,
W. W. LEWIS.